US010066138B2

(12) United States Patent
Kodama et al.

(10) Patent No.: US 10,066,138 B2
(45) Date of Patent: Sep. 4, 2018

(54) ROOM-TEMPERATURE-CURABLE SILICONE RUBBER COMPOSITION, THE USE THEREOF, AND METHOD FOR REPAIRING ELECTRONIC DEVICE

(71) Applicant: DOW CORNING TORAY CO., LTD., Tokyo (JP)

(72) Inventors: Harumi Kodama, Chiba (JP); Masayuki Onishi, Chiba (JP)

(73) Assignee: DOW CORNING TORAY CO., LTD., Tokyo (JP)

( * ) Notice: Subject to any disclaimer, the term of this patent is extended or adjusted under 35 U.S.C. 154(b) by 52 days.

(21) Appl. No.: 15/106,538

(22) PCT Filed: Dec. 25, 2014

(86) PCT No.: PCT/JP2014/006473
§ 371 (c)(1),
(2) Date: Jun. 20, 2016

(87) PCT Pub. No.: WO2015/098118
PCT Pub. Date: Jul. 2, 2015

(65) Prior Publication Data
US 2017/0037287 A1    Feb. 9, 2017

(30) Foreign Application Priority Data
Dec. 27, 2013   (JP) ................................. 2013-272669

(51) Int. Cl.
| | | |
|---|---|---|
| *C08L 83/04* | (2006.01) | |
| *C09J 183/14* | (2006.01) | |
| *C09K 3/10* | (2006.01) | |
| *C08L 83/14* | (2006.01) | |
| *C08K 3/36* | (2006.01) | |
| *C08K 5/5419* | (2006.01) | |
| *C08K 5/5435* | (2006.01) | |
| *C08K 5/57* | (2006.01) | |
| *C08L 83/00* | (2006.01) | |
| *C08G 77/50* | (2006.01) | |

(52) U.S. Cl.
CPC ............... *C09J 183/14* (2013.01); *C08K 3/36* (2013.01); *C08K 5/5419* (2013.01); *C08K 5/5435* (2013.01); *C08K 5/57* (2013.01); *C08L 83/00* (2013.01); *C08L 83/04* (2013.01); *C08L 83/14* (2013.01); *C09K 3/1018* (2013.01); *C08G 77/50* (2013.01); *Y02P 20/582* (2015.11)

(58) Field of Classification Search
None
See application file for complete search history.

(56) References Cited

U.S. PATENT DOCUMENTS

| | | | | |
|---|---|---|---|---|
| 3,175,993 A * | 3/1965 | Weyenberg | ........... | C07F 7/0858 528/15 |
| 4,687,829 A * | 8/1987 | Chaffee | ................ | C08K 5/5415 524/859 |
| 4,711,928 A | 12/1987 | Lee et al. | | |
| 4,888,404 A * | 12/1989 | Klosowski | ........... | C08K 5/5415 528/15 |
| 4,898,910 A * | 2/1990 | Kamis | ..................... | C08L 83/14 524/425 |
| 4,962,174 A * | 10/1990 | Bilgrien | ................. | C08G 77/12 525/474 |
| 4,973,644 A * | 11/1990 | Onishi | ................. | C08K 5/5406 528/15 |
| 5,053,442 A | 10/1991 | Chu et al. | | |
| 5,091,484 A * | 2/1992 | Colas | ..................... | C08L 83/04 525/477 |
| 5,208,300 A * | 5/1993 | Krahnke | ................ | C08G 77/44 525/474 |
| 5,210,156 A * | 5/1993 | Clark | ..................... | C08G 77/44 525/474 |
| 5,281,455 A * | 1/1994 | Braun | .................. | C09D 183/08 428/354 |
| 5,302,671 A * | 4/1994 | Cifuentes | ............. | C09D 183/08 525/477 |
| 5,340,899 A | 8/1994 | Altes | | |
| 5,733,996 A * | 3/1998 | De Buyl | ................ | C08K 5/057 528/17 |

(Continued)

FOREIGN PATENT DOCUMENTS

| | | |
|---|---|---|
| EP | 0240163 A2 | 10/1987 |
| JP | S55041702 A | 3/1980 |

(Continued)

OTHER PUBLICATIONS

PCT/JP2014/006473 International Search Report dated Apr. 7, 2015, 4 pages.
English language abstract and machine translation for JPS55041702 (A) extracted from https://4.j-platpat.inpit.go.jp database on Jun. 16, 2016, 5 pages.
English language abstract and machine translation for JPS62207383 (A) extracted from http://worldwide.espacenet.com database on Jun. 16, 2016, 13 pages.

(Continued)

*Primary Examiner* — Robert S Loewe
(74) *Attorney, Agent, or Firm* — Warner Norcross & Judd LLP

(57) ABSTRACT

A room-temperature-curable silicone rubber composition which exhibits good adhesion to a substrate contacted during curing and which forms a silicone rubber cured product that can be efficiently peeled is disclosed. The room-temperature-curable silicone rubber composition comprises: (A) an organopolysiloxane having in each molecule at least two specified alkoxysilyl-containing groups on silicon atoms in the molecular chain, (B) a diorganodialkoxysilane or partially hydrolyzed condensate thereof, and (C) a condensation-reaction catalyst.

14 Claims, No Drawings

(56) References Cited

U.S. PATENT DOCUMENTS

| | | | | | |
|---|---|---|---|---|---|
| 5,840,794 | A | * | 11/1998 | Palmer | C08K 5/057 524/425 |
| 5,948,854 | A | * | 9/1999 | de Buyl | C08K 5/057 523/209 |
| 6,132,664 | A | * | 10/2000 | Freiberg | C08L 83/04 264/261 |
| 6,235,832 | B1 | * | 5/2001 | Deng | C08L 83/04 524/492 |
| 6,288,152 | B1 | * | 9/2001 | Okabe | C08L 83/04 524/102 |
| 6,512,072 | B1 | * | 1/2003 | Gantner | A61K 8/585 106/15.05 |
| 6,784,241 | B2 | * | 8/2004 | Sakamoto | C08G 77/50 524/266 |
| 7,482,062 | B2 | * | 1/2009 | Higuchi | C08G 77/50 428/447 |
| 7,781,560 | B2 | | 8/2010 | Ushio et al. | |
| 2002/0143100 | A1 | * | 10/2002 | Morimoto | C08K 3/36 524/588 |
| 2003/0153672 | A1 | * | 8/2003 | Sakamoto | C08K 3/36 524/588 |
| 2003/0212197 | A1 | * | 11/2003 | Sakamoto | C08G 77/50 524/588 |
| 2004/0002571 | A1 | * | 1/2004 | Sakamoto | C08L 83/04 524/588 |
| 2004/0176528 | A1 | * | 9/2004 | Yoshitake | C08L 83/04 524/588 |
| 2006/0258817 | A1 | | 11/2006 | Kimura | |
| 2008/0293865 | A1 | * | 11/2008 | Kameda | C08L 83/04 524/425 |
| 2009/0105441 | A1 | | 4/2009 | Ushio et al. | |
| 2010/0130658 | A1 | * | 5/2010 | Iwasaki | C08L 83/04 524/266 |
| 2014/0066570 | A1 | | 3/2014 | Kodama et al. | |

FOREIGN PATENT DOCUMENTS

| | | |
|---|---|---|
| JP | S62207383 A | 9/1987 |
| JP | S62212488 A | 9/1987 |
| JP | H02133490 A | 5/1990 |
| JP | 07-097519 A | 4/1995 |
| JP | H07113083 A | 5/1995 |
| JP | 2003049072 A | 2/2003 |
| JP | 2006022277 A | 1/2006 |
| JP | 2006022278 A | 1/2006 |
| JP | 2006316190 A | 11/2006 |
| JP | 2006348119 A | 12/2006 |
| JP | 2007231172 A | 9/2007 |
| JP | 2012219113 A | 11/2012 |
| JP | 2013221135 A | 10/2013 |

OTHER PUBLICATIONS

English language abstract and machine translation for JPS62212488 (A) extracted from http://worldwide.espacenet.com database on Jun. 16, 2016, 13 pages.

English language abstract and machine translation for JPH02133490 (A) extracted from http://worldwide.espacenet.com database on Jun. 16, 2016, 10 pages.

English language abstract and machine translation for JP07097519 (A) extracted from https://4.j-platpat.inpit.go.jp database on Jun. 16, 2016, 21 pages.

English language abstract and machine translation for JPH07113083 (A) extracted from http://worldwide.espacenet.com database on Jun. 16, 2016, 21 pages.

English language abstract and machine translation for JP2003049072 (A) extracted from https://4.j-platpat.inpit.go.jp database on Jun. 16, 2016, 27 pages.

English language abstract and machine translation for JP2006022277 (A) extracted from https://4.j-platpat.inpit.go.jp database on Jun. 16, 2016, 23 pages.

English language abstract and machine translation for JP2006022278 (A) extracted from https://4.j-platpat.inpit.go.jp database on Jun. 16, 2016, 19 pages.

English language abstract and machine translation for JP2006316190 (A) extracted from http://worldwide.espacenet.com database on Jun. 16, 2016, 16 pages.

English language abstract and machine translation for JP2006348119 (A) extracted from http://worldwide.espacenet.com database on Jun. 16, 2016, 17 pages.

English language abstract and machine translation for JP2007231172 (A) extracted from http://worldwide.espacenet.com database on Jun. 16, 2016, 17 pages.

English language abstract and machine translation for JP2012219113 (A) extracted from http://worldwide.espacenet.com database on Jun. 16, 2016, 16 pages.

English language abstract and machine translation for JP2013221135 (A) extracted from https://4.j-platpat.inpit.go.jp database on Jun. 16, 2016, 37pages.

* cited by examiner

ROOM-TEMPERATURE-CURABLE SILICONE RUBBER COMPOSITION, THE USE THEREOF, AND METHOD FOR REPAIRING ELECTRONIC DEVICE

CROSS-REFERENCE TO RELATED APPLICATIONS

This application is the National Stage of International Application No. PCT/JP2014/006473 filed on 25 Dec. 2014, which claims priority to and all advantages of Japanese Patent Application No. 2013-272669 filed on 27 Dec. 2013, the content of which is hereby incorporated by reference.

TECHNICAL FIELD

The present invention relates to a room-temperature-curable silicone rubber composition that cures at room temperature by contact with moisture in air, a silicone rubber cured product obtained by curing the room-temperature-curable silicone rubber composition, an electronic device provided with the silicone rubber cured product, and a method for repairing the electronic device. Priority is claimed on Japanese Patent Application No. 2013-272669, filed on Dec. 27, 2013, the content of which is incorporated herein by reference.

BACKGROUND ART

Room-temperature-curable silicone rubber compositions that form a silicone rubber cured product by curing at room temperature by contacting moisture in air are used as sealants and adhesives of electrical-electronic equipment because they do not require heating to cure (refer to Patent Documents 1 to 4). Such a room-temperature-curable silicone rubber composition has the feature that when it has been cured in the state where it contacts an electrical circuit or electrode, the silicone rubber cured product can be removed from that electrical circuit or electrode even after a long time has elapsed, and repair and recycling are possible.

However, although the room-temperature-curable silicone rubber compositions described in Patent Documents 1 to 4 form silicone rubber cured products with good adhesion to a substrate, they have the problem that when the silicone rubber cured product is removed from the substrate, the silicone rubber cured product breaks, causes cohesive failure, or is difficult to remove efficiently.

CITATION LIST

Patent Literature

Patent Document 1: Japanese Unexamined Patent Application Publication No. 2006-22277A
Patent Document 2: Japanese Unexamined Patent Application Publication No. 2006-22278A
Patent Document 3: Japanese Unexamined Patent Application Publication No. 2007-231172A
Patent Document 4: Japanese Unexamined Patent Application Publication No. 2012-219113A

SUMMARY OF INVENTION

Technical Problem

An object of the present invention is to provide a room-temperature-curable silicone rubber composition which, by curing at room temperature by contacting moisture in air, forms a silicone rubber cured product exhibiting good adhesion to and exhibiting good releasability from a substrate contacted during curing.

Solution to Problem

As a result of diligent research to solve the above problems, the present inventors discovered that the above problems can be solved by using a room-temperature-curable silicone rubber composition containing (A) an organopolysiloxane having in each molecule at least two alkoxysilyl-containing groups, (B) a prescribed alkoxysilane or partially hydrolyzed condensate thereof, and (C) a condensation-reaction catalyst, and they thereby achieved the present invention.

Specifically, the room-temperature-curable silicone rubber composition of the present invention comprises:

(A) an organopolysiloxane having in each molecule at least two alkoxysilyl-containing groups represented by the general formula:

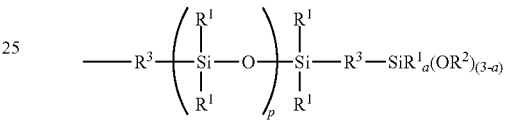

(wherein $R^1$ is the same or different monovalent hydrocarbon group lacking an aliphatic unsaturated bond, $R^2$ is an alkali group, $R^3$ is the same or different alkylene group, a is an integer from 0 to 2, and p is an integer from 1 to 50)
on silicon atoms in the molecular chain;

(B) an alkoxysilane represented by the general formula:

(wherein $R^4$ is a monovalent hydrocarbon group, and $R^5$ is an alkyl group) or a partially hydrolyzed condensate thereof; and (C) a condensation-reaction catalyst.

More advantageously, the room-temperature-curable silicone rubber composition of the present invention further comprises:

(D) a silicone resin represented by the average unit formula:

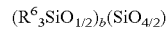

(wherein $R^6$ is the same or different monovalent hydrocarbon group, and b is a number from 0.5 to 1.5).

The viscosity at 25 C of component (A) is preferably within a range of 100 to 1,000,000 mPa s.

Component (A) is preferably a straight-chain organopolysiloxane having an alkoxysilyl-containing group on a silicon atom at both molecular terminals.

The alkoxysilyl-containing group in component (A) is preferably a group represented by the formula:

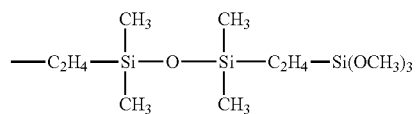

Component (B) is preferably dimethyldimethoxysilane, methylphenyldimethoxysilane, or diphenyldimethoxysilane.

More advantageously, the room-temperature-curable silicone rubber composition of the present invention contains from 0.5 to 30 parts by mass of component (B), contains from 0.1 to 10 parts by mass of component (C), and contains from 10 to 250 parts by mass of component (D), relative to 100 parts by mass of component (A).

The room-temperature-curable silicone rubber composition of the present invention preferably further comprises (E) an organopolysiloxane lacking a hydroxyl group and an alkoxy group on a silicon atom in the molecular chain.

The room-temperature-curable silicone rubber composition of the present invention preferably further comprises (F) an adhesion promoter.

Component (F) is preferably selected from the group consisting of epoxy group-containing alkoxysilanes, acrylic group-containing alkoxysilanes, amino group-containing alkoxysilanes, and reaction mixtures of epoxy group-containing alkoxysilanes and amino group-containing alkoxysilanes.

The room-temperature-curable silicone rubber composition of the present invention preferably further comprises (G) a reinforcing filler.

Component (G) is preferably selected from the group consisting of fumed silica fine powder, precipitated silica fine powder, baked silica fine powder, and fumed titanium oxide fine powder.

The present invention further relates to a silicone rubber cured product which is obtained by curing the above room-temperature-curable silicone rubber composition of the present invention.

The present invention also relates to an electronic device provided with the above silicone rubber cured product.

The present invention additionally relates to a method for repairing an electronic device using the above silicone rubber cured product.

Advantageous Effects of Invention

The room-temperature-curable silicone rubber composition according to the present invention, by curing at room temperature by contacting moisture in air, can form a silicone rubber cured product exhibiting good adhesion to a substrate contacted during curing, and exhibiting good releasability without causing cohesive failure when peeled from the substrate.

Additionally, the room-temperature-curable silicone rubber composition according to the present invention that further contains the silicone resin component (D) exhibits improved mechanical strength, and can exhibit excellent reparability and reusability because remnant adhesive when peeled is reduced.

Additionally, the silicone rubber cured product according to the present invention exhibits good adhesion to a substrate contacted during curing, and exhibits good releasability by which it can be efficiently peeled from the substrate. Furthermore, the electronic device according to the present invention has good reliability due to the above-mentioned high adhesion to and releasability from the substrate of the silicone rubber cured product. Also, the method for repairing an electronic device according to the present invention can easily repair an electronic device because it uses the above silicone rubber cured product having high releasability.

DESCRIPTION OF EMBODIMENTS

<Room-Temperature-Curable Silicone Rubber Composition>

The room-temperature-curable silicone rubber composition according to the present invention comprises the above components (A) to (C). Such a room-temperature-curable silicone rubber composition, by curing at room temperature by contacting moisture in air, can form a silicone rubber cured product exhibiting good adhesion to a substrate contacted during curing, and exhibiting good releasability by which it can be efficiently peeled from the substrate. Each of the components will be described in detail below. Note that in the present specification, viscosity is the value measured using a type-B viscometer according to JIS K 7117-1 at 25 C.

Component (A) is the base compound of the present composition, and is an organopolysiloxane having in each molecule at least two alkoxysilyl-containing groups represented by the general formula:

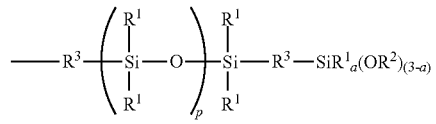

on silicon atoms in the molecular chain.

In the formula, $R^1$ is the same or different monovalent hydrocarbon group lacking an aliphatic unsaturated bond, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, or aryl group is preferred, and a methyl group or phenyl group is more preferred. In the formula, $R^2$ is an alkyl group, examples of which include a methyl group, ethyl group, propyl group, butyl group, pentyl group, hexyl group, heptyl group, octyl group, nonyl group, decyl group, and octadecyl group. A methyl group or ethyl group is preferred. In the formula $R^3$ is the same or different alkylene group, examples of which include a methylmethylene group, ethylene group, methylethylene group, propylene group, butylene group, pentylene group, hexylene group, heptylene group, and octylene group. A methylmethylene group, ethylene group, methylethylene group, or propylene group is preferred. In the formula, a is an integer from 0 to 2, and preferably 0 or 1. In the formula, p is an integer from 1 to 50, preferably an integer from 1 to 20, more preferably an integer from 1 to 10, and particularly preferably an integer from 1 to 5.

Examples of such alkoxysilyl-containing groups include groups represented by the formula:

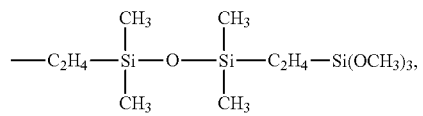

groups represented by the formula:

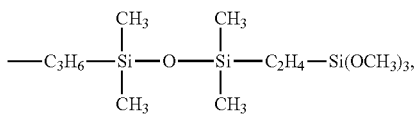

groups represented by the formula:

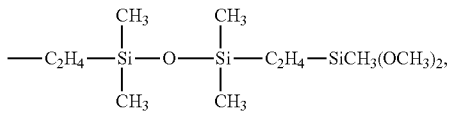

groups represented by the formula:

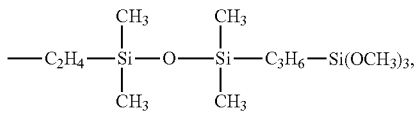

groups represented by the formula:

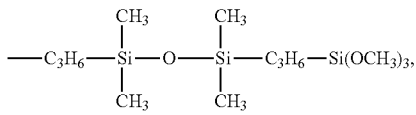

groups represented by the formula:

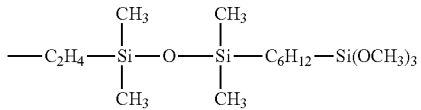

and groups represented by the formula:

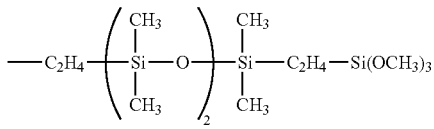

Examples of groups other than the alkoxysilyl-containing groups bonded to silicon atoms in the molecular chain of component (A) include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group, vinyl group, or phenyl group is more preferred.

The molecular structure of component (A) is not limited and, for example, may have a straight, partially branched straight, branched, or cyclic molecular structure, among which straight, partially branched straight, or branched molecular structures are preferable. The alkoxysilyl-containing groups may be bonded to silicon atoms at the molecular chain terminals, or to silicon atoms along the molecular chain. As component (A), an organopolysiloxane having a straight-chain molecular structure and having the alkoxysilyl-containing groups mentioned above on a silicon atom at both terminals of the molecular chain is preferred.

The viscosity at 25 C of component (A) is not limited, but is preferably in a range of 100 to 1,000,000 mPas, and more preferably in a range of 100 to 100,000 mPas. When the viscosity of component (A) is not less than the minimum value of the range given above, the mechanical strength of the resulting silicone rubber cured product is improved, and when it is not greater than the maximum value of the range given above, the handling and processability of the resulting composition are improved.

Examples of the method for producing component (A) include the methods described in Japanese Unexamined Patent Application Publication Nos. S62-207383A and S62-212488A.

Component (B) is a characteristic component that acts as a crosslinking agent of the present composition, for exhibiting good releasability from a substrate contacted during curing after time has elapsed, and is a diorganodialkoxysilane represented by the general formula:

$$R^4_2Si(OR^5)_2$$

(wherein $R^4$ is a monovalent hydrocarbon group, and $R^5$ is an alkyl group), or a partially-hydrolyzed condensate thereof.

In the formula, $R^4$ is the same or different monovalent hydrocarbon group, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group is more preferred. Furthermore, in the formula, $R^5$ is the same or different alkyl group, examples of which include a methyl group, ethyl group, propyl group, butyl group, pentyl group, and hexyl group. A methyl group is preferred.

Examples of component (B) include dimethyldimethoxysilane, methylphenyldimethoxysilane, diphenyldimethoxysilane, and partially hydrolyzed condensates thereof. Component (B) may be one of these diorganodialkoxysilanes or partially hydrolyzed condensates thereof used alone or a combination of two or more used as a mixture.

There is no limitation on the content of component (B), but, for example, it is in the range of 0.5 to 30 parts by mass relative to 100 parts by mass of component (A), preferably in the range of 0.5 to 20 parts by mass, more preferably in the range of 0.5 to 15 parts by mass, and particularly preferably in the range of 0.5 to 10 parts by mass. When the content of component (B) is not less than the minimum value of the range given above, the curability of the resulting composition is sufficient and the shelf life of the resulting composition under moisture blocking is improved, and when it is not greater than the maximum value of the range given above, the resulting composition cures rapidly by moisture in air.

Component (C) is a condensation-reaction catalyst that promotes crosslinking of the present composition. Examples of this component (C) include tin compounds such as dimethyltin dineodecanoate and stannous octoate, titanium compounds such as tetra(isopropoxy)titanium, tetra(n-butoxy)titanium, tetra(t-butoxy)titanium, di(isopropoxy)bis (ethylacetoacetate)titanium, di(isopropoxy)bis(methylacetoacetate)titanium, and di(isopropoxy)bis(acetylacetonate) titanium, and the like.

There is no limitation on the content of component (C), but, for example, it is in the range of 0.01 to 10 parts by mass relative to 100 parts by mass of component (A) and preferably in the range of 0.1 to 6 parts by mass. When the content of component (C) is not less than the minimum value of the range given above, the resulting composition cures rapidly by moisture in air, and when it is not greater than the maximum value of the range given above, the shelf life of the resulting composition is improved.

The room-temperature-curable silicone rubber composition according to the present invention may also contain components other than components (A) to (C); for example, it may further contain components (D) to (G) below.

Component (D) is a component for imparting a suitable degree of mechanical strength to the silicone rubber cured product obtained by curing the present composition, and reducing remnant adhesive when the silicone rubber cured product is efficiently peeled from a substrate contacted during curing, and as a result, improving reparability and reusability. It is a silicone resin represented by the average unit formula:

$$(R^6{}_3SiO_{1/2})_b(SiO_{4/2})$$

(wherein $R^6$ is the same or different monovalent hydrocarbon group, and b is a number from 0.5 to 1.5).

The room-temperature-curable silicone rubber composition according to the present invention that further contains such a component (D) exhibits improved mechanical strength, and it can exhibit excellent reparability and reusability because adhesive residue when peeled is reduced.

In the formula that represents component (D), $R^6$ is the same or different monovalent hydrocarbon group, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group, vinyl group, or phenyl group is more preferred. In the formula, b is from 0.5 to 1.5, and more preferably from 0.6 to 1.3. Furthermore, the silicone resin (D) preferably contains from 0.2 to 5.0% by mass of silicon atom-bonded hydroxyl groups or silicon atom-bonded alkoxy groups in the molecule. The content of such silicon atom-bonded hydroxyl groups may be measured by nuclear magnetic resonance, for example. Such silicone resins (D) are known in the technical field, and various commercially available silicone resins may be suitably used.

There is no limitation on the content of component (D), but, for example, it is in the range of 10 to 250 parts by mass relative to 100 parts by mass of component (A), preferably in the range of 20 to 220 parts by mass, and more preferably in the range of 30 to 200 parts by mass.

Component (E) is a component for making the silicone rubber cured product obtained from the present composition suitably soft, and for improving adhesion. It is an organopolysiloxane lacking a hydroxyl group and an alkoxy group on a silicon atom in the molecular chain. Examples of groups other than hydroxyl groups and alkoxy groups bonded to a silicon atom in component (E) include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, alkenyl group, or aryl group is preferred, and a methyl group, vinyl group, or phenyl group is more preferred. Examples of component (E) include dimethylpolysiloxane capped at both molecular terminals with dimethylvinylsiloxy groups and dimethylpolysiloxane capped at both ends with trimethylsiloxy groups, and the like. The molecular structure of component (E) is not limited and, for example, may have a straight, partially branched straight, branched or cyclic molecular structure, among which straight, partially branched straight or branched molecular structures are preferable. The viscosity at 25 C of component (E) is not limited, but is preferably in a range of 10 to 1,000,000 mPas, and more preferably in a range of 50 to 100,000 mPas. When the viscosity of component (E) is not less than the minimum value of the range given above, bleed-out of component (E) from the resulting silicone rubber cured product can be controlled, and when it is not greater than the maximum value of the range given above, the handling and processability of the resulting composition are improved.

There is no limitation on the content of component (E), but, for example, it is in the range of 1 to 10 parts by mass relative to 100 parts by mass of component (A), preferably in the range of 1 to 80 parts by mass, more preferably in the range of 1 to 70 parts by mass, and particularly preferably in the range of 1 to 60 parts by mass. When the content of component (E) is greater than or equal to the minimum value of the range given above, the adhesion of the resulting composition is good, and when it is less than or equal to the maximum value of the range given above, bleed-out of component (E) from the resulting silicone rubber cured product can be controlled. In particular, the content of component (E) is preferably in a range of 15 to 60 parts by mass relative to 100 parts by mass of component (A) because adhesion to organic resin is good.

Component (F) is an adhesion promoter, for improving adhesion to organic resins contacted during curing of the present composition. Examples of the adhesion promoter of component (F) include epoxy group-containing alkoxysilanes such as 3-glycidoxytrimethoxysilane, 3-glycidoxypropyltriethoxysilane, 3-glycidoxypropylmethoxysilane, 2-(3, 4-epoxycyclohexyl)ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes. Reaction mixtures of the above epoxy group-containing alkoxysilanes and the above amino group-containing alkoxysilanes are preferred. Examples of methods for preparing such reaction mixtures of the above epoxy group-containing alkoxysilanes and the above amino group-containing alkoxysilanes include the methods described in Japanese Examined Patent Application Publication Nos. S55-41702A and H07-113083A.

The content of component (F) is not limited provided that it is an amount that can impart sufficient adhesion to the organic resin that the present composition contacts during curing, but it is preferably in the range of 0.01 to 10 parts by mass relative to 100 parts by mass of component (A), and more preferably in the range of 0.01 to 5 parts by mass. When the content of component (F) is not less than the minimum value of the range given above, the adhesion to organic resin is sufficient, and when it is not greater than the maximum value of the range given above, the resulting composition cures rapidly by contacting moisture in air.

Component (G) is a reinforcing filler for imparting mechanical strength to the silicone rubber cured product obtained by curing the present composition, and improving releasability from the substrate. Examples of component (G) include fumed silica fine powder, precipitated silica fine powder, fused silica fine powder, baked silica fine powder, fumed titanium dioxide fine powder, glass fiber and hydrophobized fine powders obtained by surface treating these fine powders with organosilanes, silazanes, and siloxane oligomers. Although no particular limitation is placed on the particle diameter of the fine powder of component (G), it may be, for example, in the range of 0.01 micro meters to 1000 micro meters by median diameter according to measurement using laser diffraction/scattering type particle size distribution.

The content of component (G) is not limited, but is preferably from 0.1 to 50 parts by mass relative to 100 parts by mass of component (A).

Additionally, the present composition may also contain other optional components, provided that the object of the present invention is not hindered, examples of which include non-reinforcing fillers such as quart fine powder, calcium carbonate fine powder, diatomaceous earth fine powder, aluminum hydroxide fine powder, alumina fine powder, magnesium hydroxide fine powder, magnesia fine powder, zinc oxide fine powder, zinc carbonate fine powder, and hydrophobized fine powders obtained by surface treating these fine powders with organosilanes, silazanes, and siloxane oligomers; organic solvents; antifungal agents; flame retardants; heat-resisting agents; plasticizers; thixotropy imparting agents; curing promoters; corrosion/migration inhibitor for wiring or electrode, and/or pigments such as carbon black.

The present invention may be produced by uniformly mixing components (A) to (C) and component (D), and, as necessary, components (E) to (G) and other optional components under moisture blocking. The method for mixing the components of the silicone composition may be a conventional known method and is not particularly limited, but is normally uniform mixing by simple stirring. Furthermore, when solid components such as inorganic fillers or the like are contained as optional components, mixing using a mixing device is more preferable. Such a mixing device is not particularly limited, but is exemplified by a single-screw or twin-screw continuous mixer, twin roller, Ross mixer, Hobart mixer, dental mixer, planetary mixer, kneader mixer, Henschel mixer, and the like. The present mixture prepared in this manner can be stored for a long period by sealing in an air-tight container under moisture blocking.

<Silicone Rubber Cured Product>

The silicone rubber cured product according to the present invention is obtained by curing the room-temperature-curable silicone rubber composition described above. The method for curing the room-temperature-curable silicone rubber composition is not particularly limited, but normally, the composition can be rapidly cured by contacting moisture in air to form a silicone rubber cured product. Such a silicone rubber cured product exhibits good adhesion to a substrate contacted during curing, and exhibits good releasability by which it can be efficiently peeled from the substrate.

<Electronic Device>

The electronic device according to the present invention is provided with the silicone rubber cured product described above. The electronic device is not particularly limited, but is exemplified by electronic devices that contain electrical circuits or electrodes in which metal oxide film electrodes such as indium tin oxide (ITO) are formed, and metal electrodes of silver, copper, aluminum, gold or the like on a substrate such as glass, epoxy resin, polyimide resin, phenolic resin, ceramic or the like. Examples of such electrodes include electrodes of liquid crystal displays (LCDs), flat panel displays (FPDs) and flat panel display devices, and the present composition may be used for coating of electrodes. Such electronic devices have good reliability due to high adhesion to and high releasability from the substrate contacted during curing of the silicone rubber cured product.

<Method for Repairing Electronic Device>

The method for repairing an electronic device according to the present invention uses the silicone rubber cured product having good releasability from a substrate described above. By such a repair method, an electronic device can be repaired easily by peeling the silicone rubber cured product without remnant adhesive, because the silicone rubber cured product has good releasability from the substrate.

EXAMPLES

The room-temperature-curable silicone rubber composition of the present invention will now be described using practical examples. Note that in the practical examples, viscosity is the value measured using a type-B viscometer according to JIS K 7117-1 at 25 C. Additionally, the releasability from and adhesion to a substrate and the reparability (reusability) of the silicone rubber cured product obtained by curing the room-temperature-curable silicone rubber composition were evaluated as follows.

<Method for Evaluating Releasability of Silicone Rubber Cured Product from Substrate>

An adhesive layer comprising a room-temperature-curable silicone rubber composition was formed at a thickness of 1 mm on a glass substrate, and this was left standing for 7 days at 25 C, 50% RH to cure the composition, thereby producing a sample. The sample was cut into strips (length 4.0 cm×width 1.0 cm×thickness 0.5 mm), and a peel test was performed at a speed of 50 mm/minute in the 180 degree direction. The condition of the adhesive broken face was observed macroscopically, and the proportion of silicone rubber cured product that incurred cohesive failure was determined as the cohesive failure (CF) rate. A CF rate of 0% signifies that cohesive failure during peeling of the silicone rubber cured product is inhibited, and that the silicone rubber cured product has good releasability from the substrate.

<Method for Evaluating Adhesion of Silicone Rubber Cured Product to Substrate>
(Measurement of Tensile Strength)
A crescent-shaped sample as described in JIS K 6252 (tear test methods for vulcanized rubbers) was cut out from the above-mentioned sample and used as a sample. Using this sample, the tear strength was measured in accordance with JIS K 6252 using an "Autograph SES-1000" manufactured by Shimadzu Corporation.
(Measurement of Elongation Ratio at Breaking)
This was measured in accordance with JIS K 6251 using an "Autograph SES-1000" manufactured by Shimadzu Corporation, and the elongation at the point where the sample used in the above tensile strength measurement broke was expressed as a proportion (%) relative to the initial value.
<Method for Evaluating Reparability of Silicone Rubber Cured Product on Substrate>
An adhesive layer comprising a room-temperature-curable silicone rubber composition was formed at a thickness of 0.5 mm on a glass substrate (3 mm×80 mm), and this was left standing for 7 days at 25 C, 50% RH to cure the composition, thereby producing a sample. A peel test was performed on the obtained silicone rubber cured product at a speed of 50 mm/minute in the 20 degree direction. Reparability (reusability) was evaluated based on the following criteria.
1: The silicone rubber cured product could be easily peeled from the substrate with absolutely no breakage during the peel test, and exhibited excellent reparability.
2: The silicone rubber cured product could be easily peeled from the substrate while breaking only once or twice during the peel test, and exhibited good reparability.
3: The silicone rubber cured product could be easily peeled from the substrate, but broke three or more times during the peel test, and had practical problems in reparability.

The following raw materials were used to prepare room-temperature-curable silicone rubber compositions of practical examples and comparative examples.

Component (A): Straight-chain dimethylpolysiloxane having viscosity of 500 mPas, and having a trimethoxysilylethyl-containing group represented by the following formula:

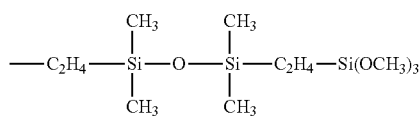

on silicon atoms at both molecular terminals
Component (B-1): Dimethyldimethoxysilane
Component (B-2): Methyltrimethoxysilane (component for comparison)
Component (C): Di(isopropoxy)bis(ethylacetoacetate)titanium
Component (D): Silicone resin represented by the average unit formula:

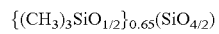

(content of silicon atom-bonded hydroxyl groups: less than 1.0% by mass)
Component (E): Straight-chain dimethylpolysiloxane having a trimethylsiloxy group on a silicon atom at both molecular terminals, having viscosity of 500 mPas
Component (G): Fumed silica powder surface-treated with hexamethyldisilazane, having a specific surface area by BET of 130 $m^2/g$ Note that component (A) above was prepared according to the method described in Japanese Unexamined Patent Application Publication No. S62-207383A.

Practical Examples 1 to 6 and Comparative Examples 1 and 2

Room-temperature-curable silicone rubber compositions were prepared by uniformly mixing component (A), component (B-1), component (B-2), component (C), component (E), and component (G) in the blending amounts shown in Table 1 under moisture blocking. The releasability of the silicone rubber cured products obtained by curing these room-temperature-curable silicone rubber compositions was evaluated. Those results are shown in Table 1.

TABLE 1

| Component | Comparative Example | | Practical Example | | | | | |
|---|---|---|---|---|---|---|---|---|
| | 1 | 2 | 1 | 2 | 3 | 4 | 5 | 6 |
| Component (A) | 100 | 100 | 100 | 100 | 100 | 100 | 100 | 100 |
| Component (E) | 60 | — | — | — | 10 | 20 | 40 | 60 |
| Component (G) | — | 15 | — | 15 | — | — | — | — |
| Component (B-1) | — | — | 2 | 2 | 2 | 2 | 2 | 2 |
| Component (B-2) | 2 | 2 | — | — | — | — | — | — |
| Component (C) | 2 | 2 | 2 | 2 | 2 | 2 | 2 | 2 |
| Cohesive Failure | 100% | 100% | 0% | 0% | 0% | 0% | 0% | 0% |

Practical Examples 6 to 13 and Comparative Example 3

Room-temperature-curable silicone rubber compositions were prepared by uniformly mixing component (A), component (B-1), component (B-2), component (C), and component (D), and a solvent if necessary, in the blending amounts shown in Table 2 under moisture blocking. The releasability, adhesion, and reparability of the silicone rubber cured products obtained by curing these room-temperature-curable silicone rubber compositions were evaluated. Those results are shown in Table 2.

TABLE 2

| Component | Comparative Example 3 | Practical Example | | | | | | | |
|---|---|---|---|---|---|---|---|---|---|
| | | 6 | 7 | 8 | 9 | 10 | 11 | 12 | 13 |
| Component (A) | 100 | 100 | 100 | 100 | 100 | 100 | 100 | 100 | 100 |
| Component (D) | 170 | 50 | 70 | 90 | 110 | 130 | 150 | 170 | 190 |
| Solvent (xylene) | — | 27 | 38 | 48 | 59 | 70 | 81 | 92 | 103 |
| Solvent (octamethyltrisiloxane) | 70 | — | — | — | — | — | — | — | — |
| Component (C) | 2 | 2 | 2 | 2 | 2 | 2 | 2 | 2 | 2 |
| Component (B-1) | — | 2 | 2 | 2 | 2 | 2 | 2 | 2 | 2 |
| Component (B-2) | 2 | — | — | — | — | — | — | — | — |

TABLE 2-continued

| Component | Comparative Example 3 | Practical Example | | | | | | | |
|---|---|---|---|---|---|---|---|---|---|
| | | 6 | 7 | 8 | 9 | 10 | 11 | 12 | 13 |
| Cohesive Failure | 100% | 0% | 0% | 0% | 0% | 0% | 0% | 0% | 0% |
| Reparability | 3 | 2 | 2 | 1 | 1 | 1 | 1 | 1 | 1 |
| Tensile Strength (MPa) | 3.9 | 1.4 | 2.6 | 6.5 | 6.2 | 6 | 5.8 | 5.4 | 4.2 |
| Elongation at Break (%) | 550 | 700 | 825 | 1200 | 1300 | 1300 | 1300 | 1200 | 1300 |

INDUSTRIAL APPLICABILITY

The room-temperature-curable silicone rubber composition of the present invention is advantageously used as a reparable sealant, adhesive, and moisture-proofing agent of electrical-electronic parts, because it cures at room temperature by contact with moisture in air and forms a silicone rubber cured product that exhibits good adhesion to the substrate contacted during curing, and, if necessary, exhibits efficient releasability.

The invention claimed is:

1. A room-temperature-curable silicone rubber composition comprising:
   (A) an organopolysiloxane having in each molecule at least two alkoxysilyl-containing groups represented by general formula:

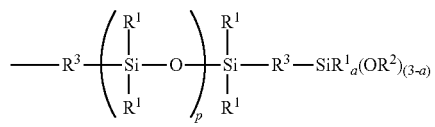

wherein $R^1$ is the same or different monovalent hydrocarbon group lacking an aliphatic unsaturated bond, $R^2$ is an alkyl group, $R^3$ is the same or different alkylene group, a is an integer from 0 to 2, and p is an integer from 1 to 50
   on silicon atoms in the molecular chain;
   (B) an alkoxysilane represented by general formula:

wherein $R^4$ is a monovalent hydrocarbon group, and $R^5$ is an alkyl group or a partially hydrolyzed condensate thereof;
   (C) a condensation-reaction catalyst, and
   (D) a silicone resin represented by average unit formula:

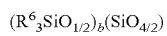

wherein $R^6$ is the same or different monovalent hydrocarbon group, and b is a number from 0.5 to 1.5; and
   optionally further comprising one or more components selected from:
   (E) an organopolysiloxane lacking a hydroxyl group and an alkoxy group on a silicon atom in the molecular chain;
   (F) an adhesion promoter; and
   (G) a reinforcing filler;
   wherein the composition is free from calcium carbonate, wherein the composition contains from 0.5 to 30 parts by mass of component (B), from 0.1 to 10 parts by mass of component (C), and from 10 to 250 parts by mass of component (D), relative to 100 parts by mass of component (A).

2. The room-temperature-curable silicone rubber composition according to claim 1, wherein viscosity at 25° C. of component (A) is in a range of 100 to 1,000,000 mPas.

3. The room-temperature-curable silicone rubber composition according to claim 1, wherein component (A) is a straight-chain organopolysiloxane having an alkoxysilyl-containing group on a silicon atom at both molecular terminals.

4. The room-temperature-curable silicone rubber composition according to claim 1, wherein the alkoxysilyl-containing group in component (A) is a group represented by formula:

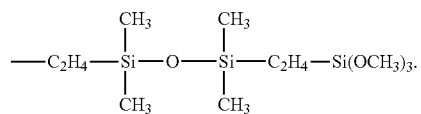

5. The room-temperature-curable silicone rubber composition according to claim 1, wherein component (B) is selected from dimethyldimethoxysilane, methylphenyldimethoxysilane, or diphenyldimethoxysilane.

6. The room-temperature-curable silicone rubber composition according to claim 1, wherein the composition comprises component (F) that is at least one type of adhesion promoter selected from the group consisting of: epoxy group-containing alkoxysilanes, acrylic group-containing alkoxysilanes, amino group-containing alkoxysilanes, and reaction mixtures of epoxy group-containing alkoxysilanes and amino group-containing alkoxysilanes.

7. The room-temperature-curable silicone rubber composition according to claim 1, wherein the composition comprises component (G) that is at least one type of reinforcing filler selected from the group consisting of: fumed silica fine powder, precipitated silica fine powder, baked silica fine powder, and fumed titanium oxide fine powder.

8. A silicone rubber cured product which is obtained by curing the room-temperature-curable silicone rubber composition described in claim 1.

9. An electronic device provided with the silicone rubber cured product described in claim 8.

10. A method for reusing an electronic device comprising a substrate and the silicone rubber cured product described in claim 8 disposed on the substrate, said method comprising peeling the silicone rubber cured product from the substrate.

11. The room-temperature-curable silicone rubber composition according to claim 1, wherein Component (G) is selected from the group consisting of fumed silica fine powder, precipitated silica fine powder, fused silica fine powder, baked silica fine powder, fumed titanium dioxide fine powder, glass fiber and combinations thereof.

12. The room-temperature-curable silicone rubber composition according to claim 1, further comprising a non-reinforcing filler selected from the group consisting of quartz fine powder, diatomaceous earth fine powder, aluminum hydroxide fine powder, alumina fine powder, magnesium hydroxide fine powder, magnesia fine powder, zinc oxide fine powder, zinc carbonate fine powder, and combinations thereof.

13. A room-temperature-curable silicone rubber composition comprising:
(A) an organopolysiloxane having in each molecule at least two alkoxysilyl-containing groups represented by general formula:

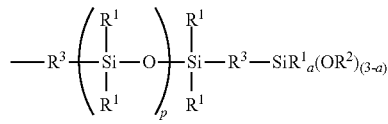

wherein $R^1$ is the same or different monovalent hydrocarbon group lacking an aliphatic unsaturated bond, $R^2$ is an alkyl group, $R^3$ is the same or different alkylene group, a is an integer from 0 to 2, and p is an integer from 1 to 50
on silicon atoms in the molecular chain;
(B) an alkoxysilane represented by general formula:

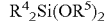

wherein $R^4$ is a monovalent hydrocarbon group, and $R^5$ is an alkyl group or a partially hydrolyzed condensate thereof;
(C) a condensation-reaction catalyst, and
(D) a silicone resin represented by average unit formula:

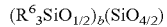

wherein $R^6$ is the same or different monovalent hydrocarbon group, and b is a number from 0.5 to 1.5; and
optionally further comprising one or more components selected from:
(E) an organopolysiloxane lacking a hydroxyl group and an alkoxy group on a silicon atom in the molecular chain;
(F) an adhesion promoter; and
(G) a reinforcing filler, wherein the composition contains from 0.5 to 30 parts by mass of component (B), from 0.1 to 10 parts by mass of component (C), and from 10 to 250 parts by mass of component (D), relative to 100 parts by mass of component (A).

14. An electronic device, comprising:
an adhesive layer formed from a room-temperature-curable silicone rubber composition, the adhesive layer being disposed between a first electronic component and a second electronic component;
wherein the room-temperature-curable silicone rubber composition comprises:
(A) an organopolysiloxane having in each molecule at least two alkoxysilyl-containing groups represented by general formula:

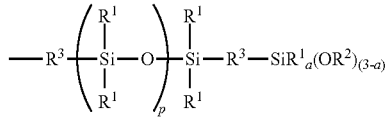

wherein $R^1$ is the same or different monovalent hydrocarbon group lacking an aliphatic unsaturated bond, $R^2$ is an alkyl group, $R^3$ is the same or different alkylene group, a is an integer from 0 to 2, and p is an integer from 1 to 50
on silicon atoms in the molecular chain;
(B) an alkoxysilane represented by general formula:
$R^4{}_2Si(OR^5)_2$
wherein $R^4$ is a monovalent hydrocarbon group, and $R^5$ is an alkyl group or a partially hydrolyzed condensate thereof; and
(C) a condensation-reaction catalyst, and optionally further comprising one or more components selected from:
(D) a silicone resin represented by average unit formula:

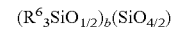

wherein $R^6$ is the same or different monovalent hydrocarbon group, and b is a number from 0.5 to 1.5;
(E) an organopolysiloxane lacking a hydroxyl group and an alkoxy group on a silicon atom in the molecular chain;
(F) an adhesion promoter; and
(G) a reinforcing filler;
wherein the composition is free from calcium carbonate.

* * * * *